United States Patent
Pretz et al.

(10) Patent No.: US 10,507,448 B2
(45) Date of Patent: Dec. 17, 2019

(54) METHODS FOR DESIGNING SCALED-UP FLUID CATALYTIC REACTORS

(71) Applicant: Dow Global Technologies LLC, Midland, MI (US)

(72) Inventors: Matthew T. Pretz, Lake Jackson, TX (US); Ben J. Freireich, Midland, MI (US); Madhusudhan Kodam, Midland, MI (US); Brien A. Stears, Galveston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/346,626

(22) PCT Filed: Oct. 30, 2017

(86) PCT No.: PCT/US2017/058989
§ 371 (c)(1),
(2) Date: May 1, 2019

(87) PCT Pub. No.: WO2018/085194
PCT Pub. Date: May 11, 2018

(65) Prior Publication Data
US 2019/0282987 A1    Sep. 19, 2019

Related U.S. Application Data

(60) Provisional application No. 62/416,525, filed on Nov. 2, 2016.

(51) Int. Cl.
*B01J 8/00* (2006.01)
*B01J 8/18* (2006.01)
(Continued)

(52) U.S. Cl.
CPC . *B01J 8/26* (2013.01); *B01J 8/18* (2013.01); *B01J 8/24* (2013.01); *B01J 2219/00015* (2013.01)

(58) Field of Classification Search
CPC ......... B01J 8/00; B01J 8/18; B01J 8/24; B01J 8/26; B01J 19/00; B01J 19/24;
(Continued)

(56) References Cited

U.S. PATENT DOCUMENTS 3,778,038 A    12/1973  Eversole et al.
4,579,716 A     4/1986  Krambeck et al.
(Continued)

FOREIGN PATENT DOCUMENTS

WO     2008080357 A1    7/2008

OTHER PUBLICATIONS

International Search Report and Written Opinion pertaining to PCT/US2017/058989, dated Feb. 14, 2018.
(Continued)

*Primary Examiner* — Natasha E Young
(74) *Attorney, Agent, or Firm* — Dinsmore & Shohl LLP (57) ABSTRACT

According to one or more embodiments of the present disclosure, a fluid catalytic reactor may be scaled-up by a method that includes one or more of constructing, operating, observing, or obtaining data related to a template fluid catalytic reactor comprising a template riser, a template lower reactor portion, and a template transition portion connecting the template riser and the template lower reactor portion. The method may further include one or more of constructing or operating a scaled-up fluid catalytic reactor based on the template fluid catalytic reactor.

15 Claims, 4 Drawing Sheets

(51) Int. Cl.
*B01J 8/24* (2006.01)
*B01J 8/26* (2006.01)
*B01J 19/00* (2006.01)

(58) Field of Classification Search
CPC .......... B01J 2219/00; B01J 2219/00002; B01J 2219/00004; B01J 2219/00015
See application file for complete search history.

(56) References Cited

U.S. PATENT DOCUMENTS

| | | |
|---|---|---|
| 4,717,467 A | 1/1988 | Haddad et al. |
| 5,190,650 A | 3/1993 | Tammera et al. |
| 5,275,641 A | 1/1994 | Tammera et al. |
| 6,069,012 A * | 5/2000 | Kayser ............... B01J 8/0015 422/130 |
| 6,166,282 A | 12/2000 | Miller |
| 6,655,664 B2 | 12/2003 | Chuang |
| 7,169,293 B2 | 1/2007 | Lomas et al. |
| 7,396,971 B2 | 7/2008 | Smith et al. |
| 7,575,725 B2 | 8/2009 | Lomas et al. |
| 7,758,817 B2 * | 7/2010 | Hedrick ............... C10G 11/18 422/139 |
| 7,902,416 B2 | 3/2011 | Glover et al. |
| 9,815,040 B2 | 11/2017 | Pretz et al. |
| 2006/0177357 A1 | 8/2006 | Yuan et al. |
| 2009/0120629 A1 | 5/2009 | Ashe |
| 2010/0320121 A1 | 12/2010 | Bauman et al. |
| 2012/0211402 A1 | 8/2012 | Monaghan et al. |
| 2013/0150233 A1 | 6/2013 | Wolschlag et al. |
| 2013/0252805 A1 | 9/2013 | Palmas et al. |
| 2014/0115871 A1 | 5/2014 | Guidat et al. |
| 2014/0115952 A1 | 5/2014 | Wang et al. |
| 2016/0272559 A1 | 9/2016 | Pretz et al. |

OTHER PUBLICATIONS

International Search Report and Written Opinion pertaining to PCT/US2017/058204, dated Feb. 7, 2018.
International Preliminary Report on Patentability pertaining to PCT/US2017/058989, dated May 16, 2019.
International Preliminary Report on Patentability pertaining to PCT/US2017/058204, dated May 16, 2019.
Office Action dated Aug. 16, 2019 pertaining to U.S. Appl. No. 16/346,586, filed May 1, 2019, 14 pgs.

* cited by examiner

METHODS FOR DESIGNING SCALED-UP FLUID CATALYTIC REACTORS

CROSS REFERENCE TO RELATED APPLICATION

This application is a national stage application claiming priority to PCT/US2017/058989, published as WO2018/085194 and filed on Oct. 30, 2017, which claims priority to U.S. Provisional Patent Application Ser. No. 62/416,525, filed Nov. 2, 2016, which is incorporated by reference in its entirety.

BACKGROUND

Field

The present disclosure generally relates to reactor units for chemical processing, and more specifically, to reactors for fluid catalytic reactions.

Technical Background

Fluid catalytic reactions, such as fluid catalytic cracking (FCC) reactions, may take place in fluid catalytic reactor systems. Generally, a fluid catalytic reactor system may include a fluid catalytic reactor and a regeneration unit. A fluid catalytic reactor may convert a feedstock chemical into the product chemical by contact with a fluidized particulate catalyst. During the reaction, the catalyst may become at least partially deactivated or "spent," and have reduced activity in reactions thereafter. Therefore, the spent catalyst may be transferred to the regeneration unit to be regenerated, thus increasing its activity from its spent state and making it available for further catalytic reactions. Following regeneration in the regeneration unit, the regenerated catalyst is transferred back into the fluid catalytic reactor for continued reactions with feedstock chemicals.

Sometimes it may be desired to scale-up at least a portion of a fluid catalytic reactor system, such as the fluid catalytic reactor. The scaled-up fluid catalytic reactor may be designed and constructed based on a smaller, original fluid catalytic reactor. However, scaling-up fluid catalytic reactors may be difficult, as scaling up the fluid catalytic reactor may change the reaction parameters which affect product output. Accordingly, improved methods and/or devices for scaling-up fluid catalytic reactors are needed.

BRIEF SUMMARY

Described herein are methods for scaling up fluid catalytic reactors. In industry, it may be desirable to scale-up a relatively small fluid catalytic reactor (referred to herein as a "template" fluid catalytic reactor) by building a larger fluid catalytic reactor (referred to herein as a "scaled-up" fluid catalytic reactor) which is based on the design of the template fluid catalytic reactor. For example, data can be collected from the template reactor and process configurations can be enhanced and/or standardized utilizing the template fluid catalytic reactor without the increased capital costs of constructing or operating a larger fluid catalytic reactor.

In some embodiments, the template fluid catalytic reactor and the scaled-up fluid catalytic reactor may include a lower reactor portion and a riser, where the lower reactor portion has a greater cross-sectional area than the riser. Such designs may utilize a transition portion which connects the lower reactor portion to the riser, where the transition portion may taper inward from the lower reactor portion to the riser such that the fluid path from the lower reaction portion to the riser is narrowed over the height of the transition portion.

Generally, a fluid catalytic reactor may be scaled-up by increasing the cross-sectional areas of various portions of the template fluid catalytic reactor by a scale-up factor, where the "scale-up factor" refers to the multiple by which the cross-sectional area is increased in the scaled-up fluid catalytic reactor relative to the template fluid catalytic reactor. For example, fluid catalytic reactors which include a lower reactor portion and a riser may be scaled-up by increasing the cross-sectional area of each of the lower reactor portion and the riser approximately by a scale-up factor. By such a scale-up process, the ratio of the cross-sectional area of the lower reactor portion to the cross-sectional area of the riser in the template fluid catalytic reactor and the scaled-up fluid catalytic reactor may be similar (e.g., within about 20%). Since the ratios are similar, the scaled-up fluid catalytic reactor may perform similarly in reactions to the template fluid catalytic reactor.

However, in such embodiments of the scale-up procedure, when the scale-up occurs, if the transition portion is to maintain its general shape (e.g., angle of taper), it must increase in height (i.e., increased distance between the riser and the lower reactor portion). However, it has been found that increasing the height of the transition portion has an effect on the velocity profile of fluids during operation of the reactor, leading to changes in product output as compared with the template reactor.

One approach to mitigating the change in velocity profile with changed transition portion height is to utilize a transition portion in the scaled-up fluid catalytic reactor that has approximately the same height as the transition portion of the template fluid catalytic reactor (e.g., within about 30%). However, to do so, the shape (e.g., the angle of taper) of the transition portion must be modified in the scaled-up fluid catalytic reactor relative to the template fluid catalytic reactor. In many cases, this strategy leads to a transition portion which has a height which is less than the width of the riser. However, it has been discovered that the velocity profile is also changed relative to the template fluid catalytic reactor when the height of the transition portion is near or much less than the width of the riser (e.g., where the height of the scaled-up transition portion is not at least 70% of the diameter of the scaled-up riser).

According to embodiments of the present disclosure, a scaled-up fluid catalytic reactor can be produced by a process which avoids the shortfalls of a scaled-up transition portion with increased height relative to the template fluid catalytic reactor, or with a scaled-up transition portion height much less than the width of the scaled-up riser. Specifically, prior to the design of the template fluid catalytic reactor, an approximate size (e.g., within 20%) for the scaled-up fluid catalytic reactor may be determined, where the transition portion height is at least 70% of the width of the riser (to avoid fluid velocity changes due to a riser width greater than the transition portion height). Once the scaled-up fluid catalytic reactor size is determined, a template reactor may be constructed, operated, observed, or data may be obtained related to the template reactor, where the height of the template transition portion is approximately the same as the height of the scaled-up transition portion (e.g., from 70% to 130% of the height of the scaled-up transition portion). Then, when the fluid catalytic reactor is scaled-up, the height of the transition portion is maintained, for example, within 30%, relative to the template fluid catalytic reactor (so that the velocity profile is about the same), and the height of the scaled-up transition section is at least 70% of the width of the scaled-up riser (so that the velocity profile is not affected by a relatively large ratio of riser diameter to transition portion height).

According to one embodiment of the present disclosure, a fluid catalytic reactor may be scaled-up by a method comprising one or more of constructing, operating, observing, or obtaining data related to a template fluid catalytic reactor comprising a template riser, a template lower reactor portion, and a template transition portion connecting the template riser and the template lower reactor portion. The method may further comprise one or more of constructing or operating a scaled-up fluid catalytic reactor based on the template fluid catalytic reactor, the scaled-up fluid catalytic reactor comprising a scaled-up riser, a scaled-up lower reactor portion, and a scaled-up transition portion connecting the scaled-up riser and the scaled-up lower reactor portion. The ratio of the cross-sectional area of the scaled-up riser to the cross-sectional area of the template riser may be from 80% to 120% of a scale-up factor. The ratio of the cross-sectional area of the scaled-up lower reactor portion to the cross-sectional area of the template lower reactor portion may be from 80% to 120% of the scale-up factor. The scale-up factor may be at least 1.3. The scale-up factor may be generally a ratio of the capacity of the reactors or the volumetric flow rate of the feed or product. The height of the scaled-up transition portion may be at least 70% of the width of the scaled-up riser and from 70% to 130% of the height of the template transition portion.

In accordance with another embodiment of the present disclosure, a fluid catalytic reactor may be scaled-up by a method comprising determining a size for a scaled-up fluid catalytic reactor that comprises a scaled-up riser, a scaled-up lower reactor portion, and a scaled-up transition portion connecting the scaled-up riser and the scaled-up lower reactor portion. Determining the size of the scaled-up fluid catalytic reactor may comprise one or more of determining within 20% of a cross-sectional area and width of the scaled-up riser, determining within 20% of a cross-sectional area of the scaled-up lower reactor portion, and determining within 20% of a height of the scaled-up transition portion. The method may further comprise one or more of constructing or operating a template fluid catalytic reactor comprising a template riser, a template lower reactor portion, and a template transition portion connecting the template riser and the template lower reactor portion. The ratio of the determined cross-sectional area of the scaled-up riser to the cross-sectional area of the template riser may be from 80% to 120% of a scale-down factor. The ratio of the determined cross-sectional area of the scaled-up lower reactor portion to the cross-sectional area of the template lower reactor portion may be from 80% to 120% of the scale-down factor. The scale-down factor may be at least 1.3. The height of the template transition portion may be at least 70% of the determined width of the scaled-up riser.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

It should be understood that the drawings are schematic in nature, and do not include some components of a fluid catalytic reactor system commonly employed in the art, such as, without limitation, temperature transmitters, pressure transmitters, flow meters, pumps, valves, and the like. It would be known that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
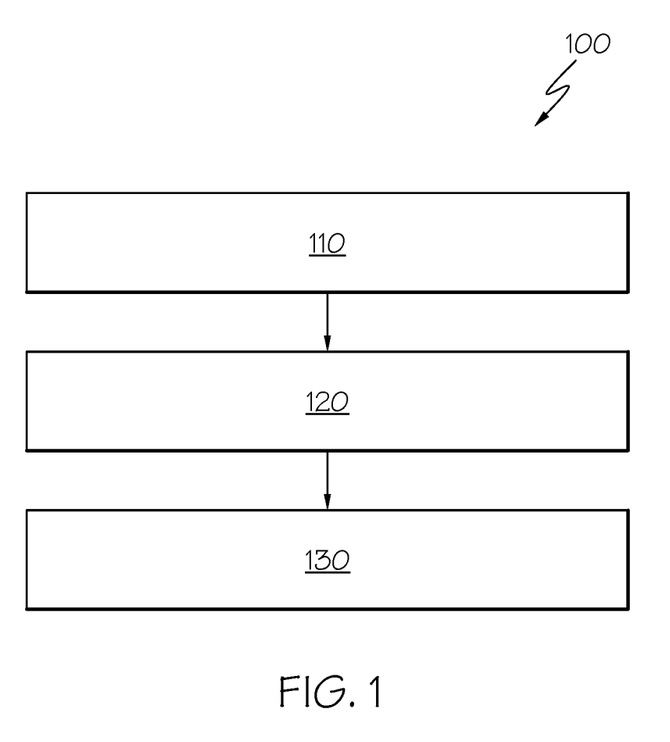
FIG. 1 schematically depicts a process flow diagram for a method for scaling up a fluid catalytic reactor, according to one or more embodiments disclosed herein.

Described herein are embodiments of processes for scaling up fluid catalytic reactors. A process 100 for scaling up a fluid catalytic reactor is schematically depicted in FIG. 1. The process 100, according to one or more embodiments, may include step 110, step 120, and step 130. Step 110 may include determining an approximate size for a scaled-up fluid catalytic reactor. Step 120 may include one or more of constructing, operating, observing, or obtaining data related to a template fluid catalytic reactor. Step 130 may include one or more of constructing or operating a scaled-up fluid catalytic reactor based on the template fluid catalytic reactor. In some embodiments, step 110 may occur prior to step 120, and step 120 may occur prior to step 130.

It should be understood that, according to various embodiments, not all of steps 110, 120, and 130 are required, as one or more of steps 110, 120, or 130 may be optional in one or more embodiments. Moreover, as at least steps 120 and 130 include multiple embodiments (i.e., constructing, operating, observing, or obtaining data related to a template fluid catalytic reactor in step 120, and constructing or operating a scaled-up fluid catalytic reactor in step 130), some embodiments of methods for scaling up fluid catalytic reactors may include one or more of the embodiments of each step and not include other embodiments of each step. For example, according to one embodiment, a method for scaling up a fluid catalytic reactor may include one or more of constructing, operating, observing, or obtaining data related to a template fluid catalytic reactor.

Figure 2:
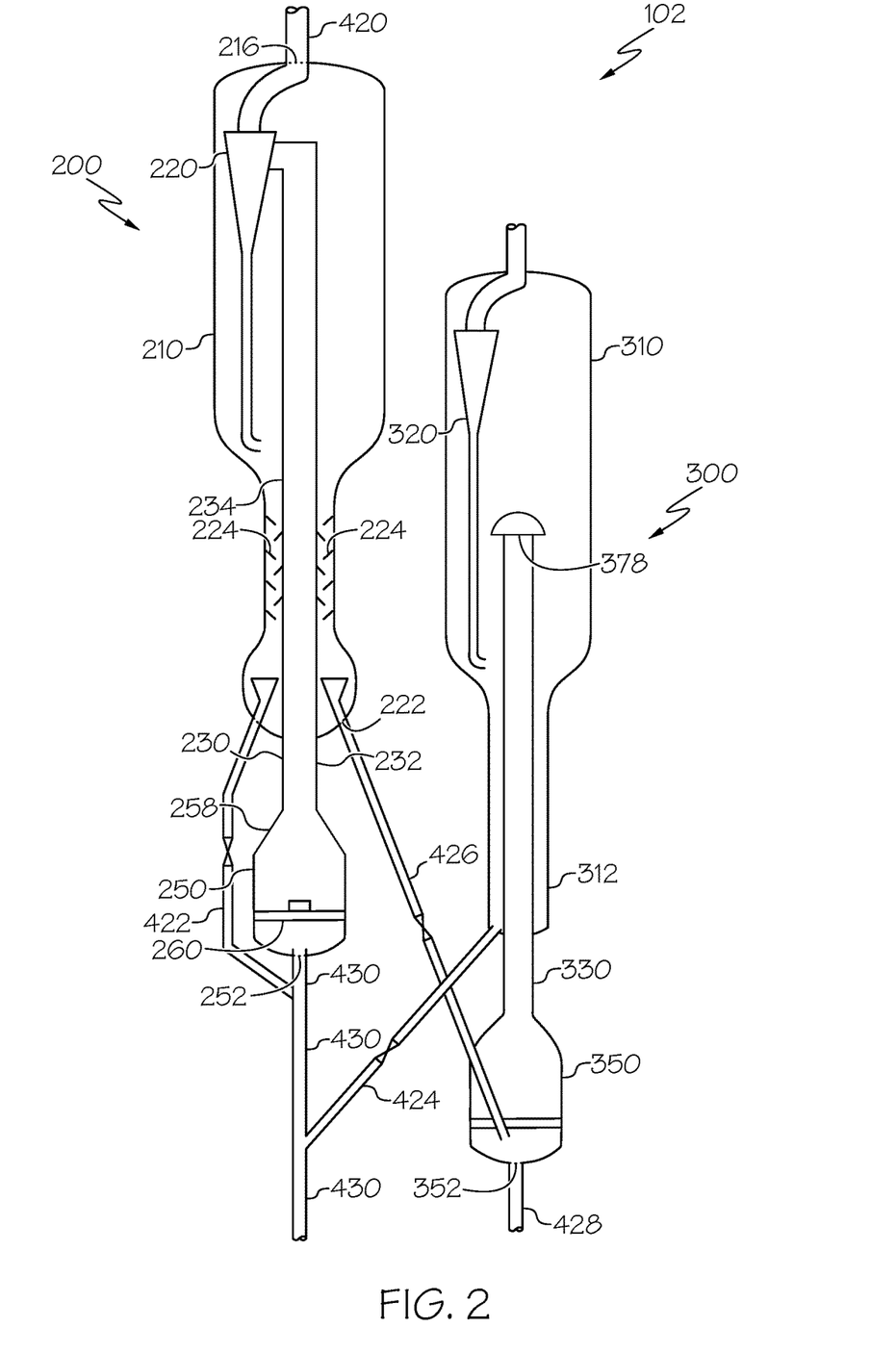
FIG. 2 schematically depicts a fluid catalytic reactor system, according to one or more embodiments disclosed herein.

Referring now to FIG. 2, a fluid catalytic reactor system 102 is schematically depicted. The fluid catalytic reactor system 102 of FIG. 2 may be representative of a template fluid catalytic reactor system or of a scaled-up fluid catalytic reactor system. The fluid catalytic reactor system 102 generally comprises multiple system components, such as a fluid catalytic reactor 200 and/or a regeneration section 300. As used herein in the context of FIG. 2, a fluid catalytic reactor generally refers to the portion of a fluid catalytic reactor system in which the major process reaction takes place. According to some embodiments, the fluid catalytic reactor 200 may also separate catalyst (sometimes spent, meaning it is at least partially deactivated) from the product stream of the reaction. Also, as used herein, a "regeneration section" generally refers to the portion of a fluid catalytic reactor system 102 where the catalyst is regenerated, such as through combustion and, in some embodiments, the regenerated catalyst is separated from the other process materials, such as evolved gases from the combusted material previously on the de-activated catalyst or from supplemental fuel.

According to one or more embodiments, as depicted in FIG. 2, the fluid catalytic reactor 200 may include a lower reactor portion 250, a riser 230, and a catalyst separation section 210. The regeneration section 300 may include a combustor 350, a riser 330, and a catalyst separation section 310. In one or more embodiments, the catalyst separation section 210 may be in fluid communication with the combustor 350 (e.g., via standpipe 426) and the catalyst separation section 310 may be in fluid communication with the lower reactor portion 250 (e.g., via standpipe 424 and transport riser 430).

It should be understood that the fluid catalytic reactor system 102 of FIG. 2 is only an example of a fluid catalytic reactor system 102 which includes a fluid catalytic reactor 200. Other embodiments for fluid catalytic reactors are contemplated herein, and fluid catalytic reactors as described herein should not be limited to those which are depicted in FIG. 2 or would be suitable for use in FIG. 2. For example, a fluid catalytic reactor could be a stand-alone device which does not include a regeneration section 300 or a catalyst separation section 210. In another embodiment, a fluid catalytic reactor may be a combustor reactor utilized to regenerate spent catalyst.

According to one or more embodiments, the fluid catalytic reactor system 102 may be operated by feeding a chemical feed and a fluidized catalyst into the lower reactor portion 250, and reacting the chemical feed by contact with a fluidized catalyst to produce a chemical product in the lower reactor portion 250 of the fluid catalytic reactor 200. The chemical product and the catalyst may be passed out of the lower reactor portion 250 and through the riser 230 to a separation device 220 in the catalyst separation section 210, where the catalyst is separated from the chemical product, which is transported out of the catalyst separation section 210. The separated catalyst is passed from the catalyst separation section 210 to the combustor 350. In the combustor 350, the catalyst may be regenerated by a chemical process such as combustion. For example, without limitation, the spent catalyst may be de-coked and/or supplemental fuel may be catalytically combusted. The catalyst is then passed out of the combustor 350 and through the riser 330 to a riser termination separator 378, where the gas and solid components from the riser 330 are partially separated. The vapor and remaining solids are transported to a secondary separation device 320 in the catalyst separation section 310 where the remaining catalyst is separated from the gases from the regeneration reaction (e.g., gases emitted by combustion of spent catalyst). The separated catalyst is then passed from the catalyst separation section 310 to the lower reactor portion 250 via standpipe 424 and transport riser 430, where it is further utilized in a catalytic reaction. Thus, the catalyst, in operation, may cycle between the fluid catalytic reactor 200 and the regeneration section 300. In general, the processed chemical streams, including the feed streams and product streams may be gaseous, and the catalyst may be fluidized particulate solid.

According to the embodiments described herein, the fluid catalytic reactor 200 comprises a lower reactor portion 250, a transition portion 258, and a riser 230. The transition portion 258 may connect the lower reactor portion 250 with the riser 230. According to one or more embodiments, the lower reactor portion 250 and the riser 230 may have a substantially constant cross-section area, while the transition portion 258 is tapered and does not have a constant cross-sectional area. As described herein, unless otherwise explicitly stated, the cross-sectional area refers to the area of the cross section of a portion of the reactor part substantially orthogonal to the direction of flow of reactants and/or products. For example, in FIG. 2, the cross sectional area of the lower reactor portion 250, the transition portion 250, and the riser 230 is in the direction of a plane defined by the horizontal direction and the direction into the page (orthogonal to the direction of fluid motion, i.e., vertically upward).

As described herein, the lower reactor portion 250 may include a vessel, drum, barrel, vat, or other container suitable for a given chemical reaction. In one or more embodiments, the lower reactor portion 250 may be generally cylindrical in shaped (i.e., having a substantially circular cross-sectional shape), or may alternately be non-cylindrically shaped, such as prism shaped with cross-sectional shaped of triangles, rectangles, pentagons, hexagons, octagons, ovals, or other polygons or curved closed shapes, or combinations thereof. The lower reactor portion 250, as used throughout this disclosure, may generally include a metallic frame, and may additionally include refractory linings or other materials utilized to protect the metallic frame and/or control process conditions. As depicted in FIG. 2, the lower reactor portion 250 may include a lower reactor portion catalyst inlet port 252 defining the connection of transport riser 430 to the lower reactor portion 250.

The lower reactor portion 250 may be connected to a transport riser 430 which, in operation, may provide regenerated catalyst and/or reactant chemicals to the fluid catalytic reactor 200. The regenerated catalyst and/or reactant chemicals may be mixed with a distributor 260 housed in the lower reactor portion 250. The catalyst entering the lower reactor portion 250 via transport riser 430 may be passed through standpipe 424 to a transport riser 430, thus arriving from the regeneration section 300. In some embodiments, catalyst may come directly from the catalyst separation section 210 via standpipe 422 and into a transport riser 430, where it enters the lower reactor portion 250. This catalyst may be slightly deactivated, but may still, in some embodiments, be suitable for reaction in the lower reactor portion 250.

Still referring to FIG. 2, the fluid catalytic reactor 200 may comprise a riser 230 which acts to transport products from the lower reactor portion 250 to the catalyst separation section 210. In one or more embodiments, the riser 230 may be generally cylindrical in shaped (i.e., having a substantially circular cross-sectional shape), or may alternately be non-cylindrically shaped, such as prism shaped with cross-sectional shaped of triangles, rectangles, pentagons, hexagons, octagons, ovals, or other polygons or curved closed shapes, or combinations thereof. The riser 230, as used throughout this disclosure, may generally include a metallic frame, and may additionally include refractory linings or other materials utilized to protect the metallic frame and/or control process conditions.

According to some embodiments, the riser 230 may include an external riser section 232 and an internal riser section 234. As used herein, an "external riser section" refers to the portion of the riser that is outside of the catalyst separation section, and an "internal riser section" refers to the portion of the riser that is within the catalyst separation section. For example, in the embodiment depicted in FIG. 2, the internal riser section 234 of the fluid catalytic reactor 200 may be positioned within the catalyst separation section 210, while the external riser section 232 is positioned outside of the catalyst separation section 210.

As depicted in FIG. 2, the lower reactor portion 250 may be connected to the riser 230 via the transition portion 258. The lower reactor portion 250 may generally comprise a greater width (e.g., diameter in a generally cylindrical embodiment) than the riser 230. The transition portion 258 may be tapered from the size of the diameter of the lower reactor portion 250 to the size of the diameter of the riser 230 such that the transition portion 258 projects inwardly from the lower reactor portion 250 to the riser 230. As used herein, a "riser width" refers to the largest cross-sectional distance of the riser. For example, a cylindrical riser has a width equal to its diameter, and a rectangular prism shaped riser has a width equal to is the square root of the sum of its first cross-sectional side squared and its second cross-sectional side squared.

In some embodiments, such as those where the lower reactor portion 250 and the riser 230 have similar cross-sectional shapes, the riser 230 transition portion 258 may be shaped as a frustum. For example, for an embodiment of a fluid catalytic reactor 200 comprising a cylindrical lower reactor portion 250 and cylindrical riser 230, the transition portion 258 may be shaped as a conical frustum. However, it should be understood that a wide variety of lower reactor portion 250 shapes are contemplated herein which connect various shapes and sizes of lower reactor portions 250 and risers 230.

In operation, the catalyst may move upward through the riser 230 (from the lower reactor portion 250), and into the separation device 220. The separated vapors may be removed from the fluid catalytic reactor system 102 via a pipe 420 at a gas outlet port 216 of the catalyst separation section 210. According to one or more embodiments, the separation device 220 may be a cyclonic separation system, which may include two or more stages of cyclonic separation. In embodiments where the separation device 220 comprises more than one cyclonic separation stages, the first separation device into which the fluidized stream enters is referred to a primary cyclonic separation device. The fluidized effluent from the primary cyclonic separation device may enter into a secondary cyclonic separation device for further separation. Primary cyclonic separation devices may include, for example, primary cyclones, and systems commercially available under the names VSS (commercially available from UOP), LD2 (commercially available from Stone and Webster), and RS2 (commercially available from Stone and Webster). Primary cyclones are described, for example, in U.S. Pat. Nos. 4,579,716; 5,190,650; and 5,275,641, which are each incorporated by reference in their entirety herein. In some separation systems utilizing primary cyclones as the primary cyclonic separation device, one or more set of additional cyclones, e.g. secondary cyclones and tertiary cyclones, are employed for further separation of the catalyst from the product gas. It should be understood that any primary cyclonic separation device may be used in embodiments of the invention.

According to one or more embodiments, following separation from vapors in the separation device 220, the catalyst may generally move through the stripper 224 to the catalyst outlet port 222 where the catalyst is transferred out of the fluid catalytic reactor 200 via standpipe 426 and into the regeneration section 300. Optionally, the catalyst may also be transferred directly back into the lower reactor portion 250 via standpipe 422. Alternatively, the catalyst may be premixed with regenerated catalyst in the transport riser 430.

Referring now to the regeneration section 300, as depicted in FIG. 2, the combustor 350 of the regeneration section 300 may include one or more lower reactor portion inlet ports 352 and be in fluid communication with the riser 330. The combustor 350 may be in fluid communication with the catalyst separation section 210 via standpipe 426, which may supply spent catalyst from the fluid catalytic reactor 200 to the regeneration section 300 for regeneration. The combustor 350 may include an additional lower reactor portion inlet port 352 where air inlet 428 connects to the combustor 350. The air inlet 428 may supply reactive gases which may react with the spent catalyst to at least partially regenerate the catalyst. For example, the catalyst may be coked following the reactions in the lower reactor portion 250, and the coke may be removed from the catalyst (i.e., regenerating the catalyst) by a combustion reaction. For example, oxidizer (such as air) may be fed into the combustor 350 via the air inlet 428. Following combustion, the regenerated catalyst may be separated in the catalyst separation section 310 and delivered back into the fluid catalytic reactor 200 via standpipe 424.

Figure 3:
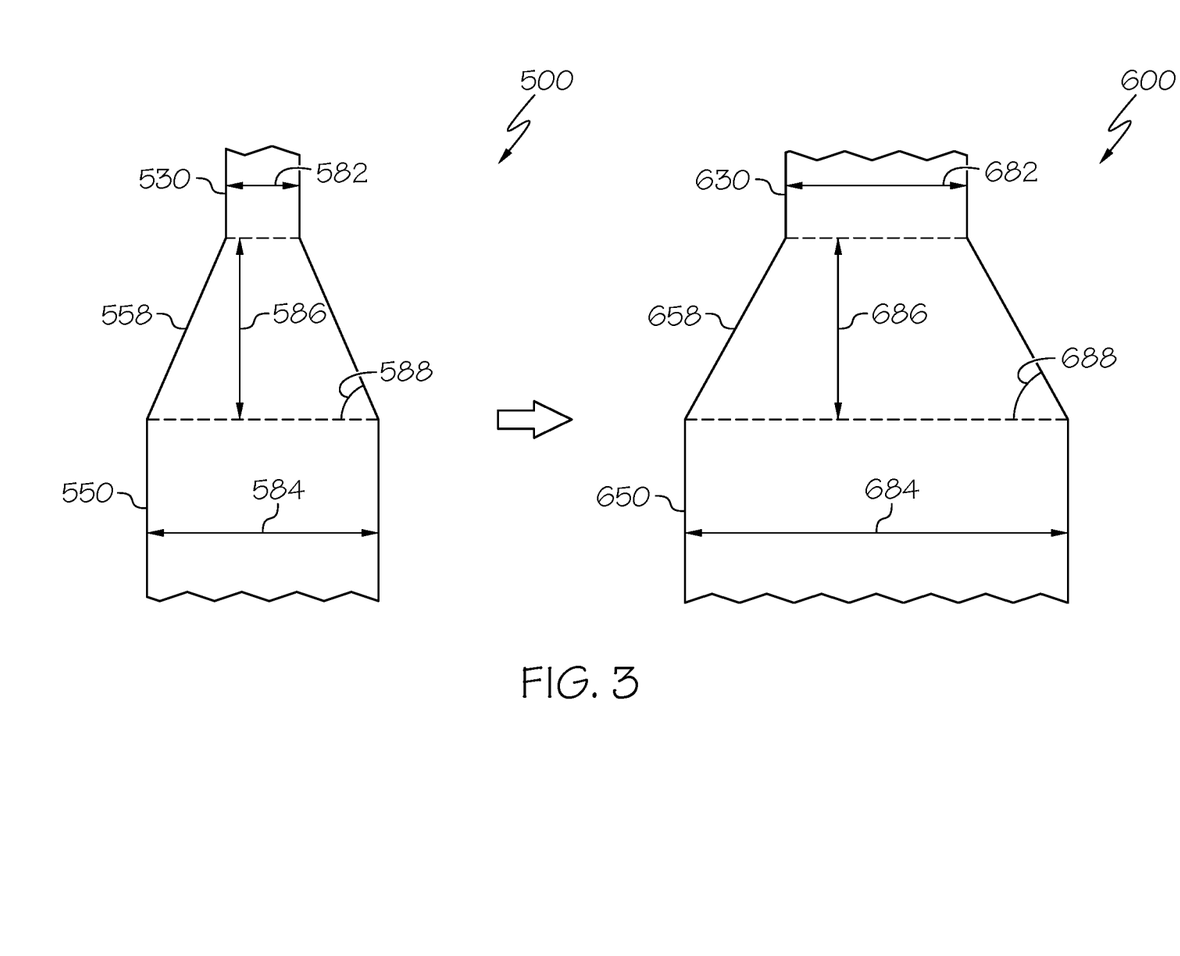
FIG. 3 schematically depicts a cross-sectional side view of a template fluid catalytic reactor and a scaled-up fluid catalytic reactor, according to one or more embodiments disclosed herein.

Now referring to FIG. 3, a template fluid catalytic reactor 500 and a scaled-up fluid catalytic reactor 600 are depicted. The template fluid catalytic reactor 500 and scaled-up fluid catalytic reactor 600 of FIG. 3 may represent portions of the fluid catalytic reactor 200 of FIG. 2. The template fluid catalytic reactor 500 comprises a template lower reactor portion 550, a template transition portion 558, and a template riser 530. Similarly, the scaled-up fluid catalytic reactor 600 comprises a scaled-up lower reactor portion 650, a scaled-up transition portion 658, and a scaled-up riser 630. The template fluid catalytic reactor 500 and scaled-up fluid catalytic reactor 600 may be utilized at least in the fluid catalytic reactor system 102 of FIG. 2.

The scale-up procedure of FIG. 1 and the embodiments of FIG. 3 are described herein in the context of a template fluid catalytic reactor 500 having a conical frustum shaped template transition portion 558, a cylindrically shaped template lower reactor portion 550, and a cylindrically shaped template riser 530. Likewise, the scale-up procedure of FIG. 1 and the embodiments of FIG. 3 are described herein in the context of a scaled-up fluid catalytic reactor 600 having a conical frustum shaped scaled-up transition portion 658, a cylindrically shaped scaled-up lower reactor portion 650, and a cylindrically shaped scaled-up riser 630. However, it should be appreciated that the scale-up procedure can be adapted to fluid catalytic reactors having different shapes.

Still referring to FIG. 3, the template lower reactor portion 550 has a width 584 (e.g., a diameter when the template lower reactor portion 550 has a circular cross-section), the template riser 530 has a width 582 (e.g., a diameter when the template riser 530 has a circular cross-section), and the template transition portion 558 has a height 586 measured as the distance between the template riser 530 and the template lower reactor portion 550. Similarly, the scaled-up lower reactor portion 650 has a width 684 (e.g. a diameter), the scaled-up riser 630 has a width 682 (e.g., a diameter), and the scaled-up transition portion 658 has a height 686 measured as the distance between the scaled-up riser 630 and the scaled-up lower reactor portion 650. The scaled-up transition portion 658 may have a frustum angle 688 and the template transition portion 558 similarly may have a frustum angle 588.

Referring again to FIG. 1 as well as FIG. 3, in an initial step 110, an approximate size for a scaled-up fluid catalytic reactor 600 may be determined. For example, the size of the scaled-up fluid catalytic reactor 600 may be determined within 20% of its eventual size when constructed. As used herein, determining the "approximate" size, such as a width or cross-sectional area of a component of the scaled-up fluid catalytic reactor 600 refers to determining the size of a respective component to within 20% of its eventual size in the constructed or operated scaled-up fluid catalytic reactor 600. Determining the approximate size of the scaled-up fluid catalytic reactor 600 may include one or more of determining an approximate cross-sectional area of the scaled-up riser, determining an approximate cross-sectional area of the scaled-up lower reactor portion 650, and determining an approximate height of the scaled-up transition portion 658. Depending on the desired shape of the scaled-up lower reactor portion 650 and scaled-up riser 630, respectively, the width 684 (e.g., diameter) of the scaled-up lower reactor portion 650 and the width 682 (e.g., diameter) of the scaled-up riser 630 can be determined.

According to embodiments, the height 686 of the scaled-up transition portion 658 is selected, based on the width 682 (e.g., diameter) of the scaled-up riser 630, such that the height 636 of the scaled-up transition portion 658 is at least 70% of the width 682 (e.g., diameter) of the scaled-up riser 630. For example, in additional embodiments, the height 636 of the scaled-up transition portion 658 is at least 75%, at least 80%, at least 85%, at least 90%, at least 95%, at least 100%, at least 105%, at least 110%, at least 115%, at least 120%, at least 125%, at least 130%, at least 150%, at least 200%, or even at least 300% of the width 682 (e.g., diameter) of the scaled-up riser 630.

Figure 4A:
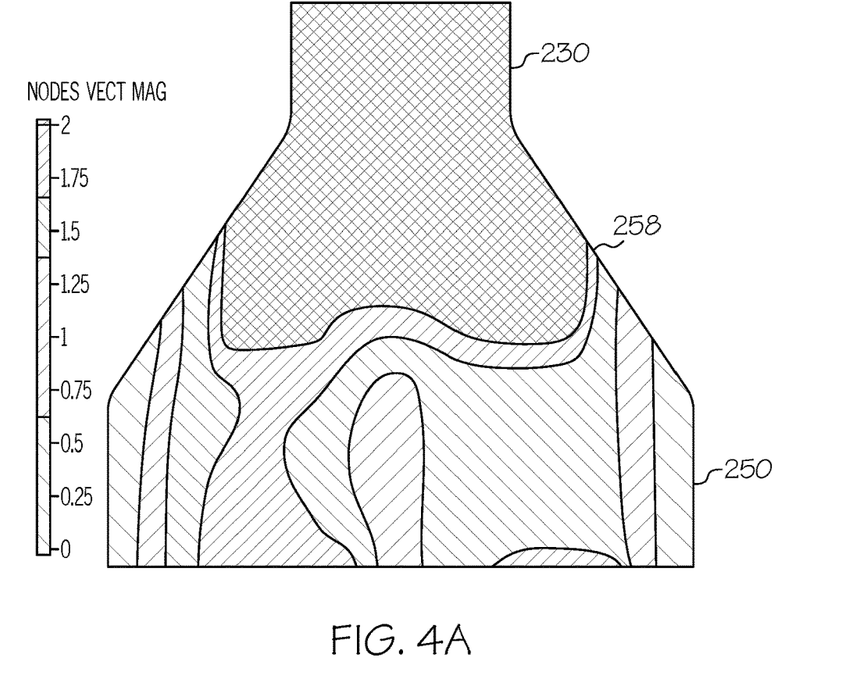
FIG. 4A schematically depicts a model of the velocity profile of fluidized material inside of a fluid catalytic reactor where the transition portion height is at least as large as the diameter of the riser.
Figure 4B:
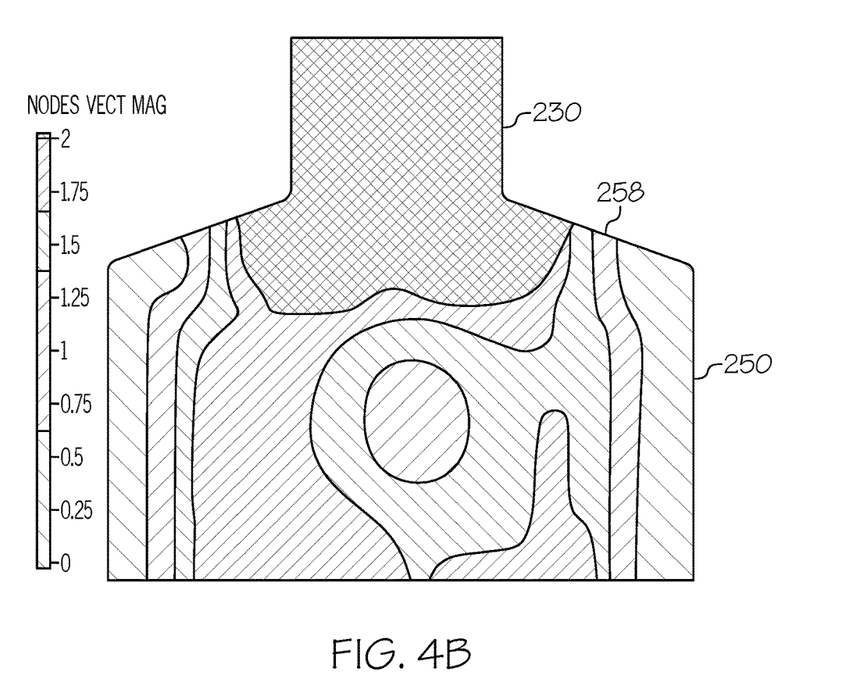
FIG. 4B schematically depicts a model of the velocity profile of fluidized material inside of a fluid catalytic reactor where the transition portion height is not at least as large as the diameter of the riser.

Without being bound by theory, it is believed that the velocity profile of reactants and products in the scaled-up lower reactor portion 650 is significantly affected by the scaled-up transition portion 658 when the scaled-up transition portion 658 has a height 686 which is less than 70% of the width 682 of the scaled-up riser 630. Referring now to FIGS. 4A and 4B, reactor designs with a conical frustum shaped transition portion 258, a cylindrical riser 230 comprising a cylindrical shape, and a lower reactor portion 250 comprising a cylindrical shape were studied by modeling fluid flow within the reactor designs. The modeling was conducted using Barracuda®, a computational fluid particle dynamics software package, which is commercially available from CPFD Software LLC (Albuquerque, N. Mex.). The fluid and particle flow is simulated by providing inlet fluid velocity and solids flux at the base of the lower reactor. The reactor designs in FIGS. 4A and 4B have identical inlet fluid velocity and solids flux. The frustum angle for the structure of FIG. 4A is 55 degrees from horizontal. The frustum angle for the structure of FIG. 4B is 20 degrees from horizontal.

FIG. 4A depicts an embodiment where the height of the transition portion 258 is greater than the diameter of the cylindrical riser 230, and FIG. 4B depicts an embodiment where the height of the transition portion 258 is less than 70% of the diameter of the cylindrical riser 230. As is depicted in FIG. 4A, where the height of the transition portion 258 is greater than the diameter of the riser 230, the fluid velocity in the lower reactor portion 250 is minimally affected, as the fluid velocity increases greatly only in the transition portion 258. On the other hand, as depicted in FIG. 4B, where the height of the transition portion 258 is less than 70% of the diameter of the riser 230, the fluid velocity in the lower reactor portion 250 is greatly affected, as high velocity begins to build in the upper regions of the lower reactor portion 250 rather than in the transition portion 258.

It should be understood that in step 110, constructing a physical reactor is not required in all embodiments. For example, step 110 may not include constructing a physical reactor, and may rather relate to designing the reactor so that a physical template reactor can be constructed, operated, observed, or have data obtained related to the physical reactor. Determining the size of the scaled-up reactor in step 110 need not require actually constructing the scaled-up reactor 600.

According to the methods described herein, a step 120 may comprise one or more of constructing, operating, observing, or obtaining data related to a template fluid catalytic reactor 500. The template fluid catalytic reactor 500 is generally a scaled-down version of the identified design of the scaled-up reactor 600. A scale-down factor determines the degree by which the template reactor is smaller than the design of the scaled-up reactor 600. For example, according to one or more embodiments, the ratio of the cross-sectional area of the scaled-up riser 630 to the cross-sectional area of the template riser 530 is from 80% to 120% of a scale-down factor, and the ratio of the cross-sectional area of the scaled-up lower reactor portion 650 to the cross-sectional area of the template lower reactor portion 550 is from 80% to 120% of the scale-down factor. Additionally, according to one or more embodiments, the height 586 of the template transition portion 558 is at least 70% of the determined width 682 of the scaled-up riser 658. According to additional embodiments, the ratio of the cross-determined sectional area of the scaled-up riser 630 to the cross-sectional area of the template riser 530 may be from 85% to 115% of the scale-down factor, from 90% to 110% of the scale-down factor, from 95% to 105% of the scale-down factor, from 98% to 102% of the scale-down factor, or from 99% to 101% of the scale-down factor. According to additional embodiments, the ratio of the designed cross-sectional area of the scaled-up lower reactor portion 650 to the cross-sectional area of the template lower reactor portion 550 may be from 85% to 115% of the scale-down factor, from 90% to 110% of the scale-down factor, from 95% to 105% of the scale-down factor, from 98% to 102% of the scale-down factor, or from 99% to 101% of the scale-down factor.

According to one or more embodiments, the scale-down factor may be at least 1.3, at least 1.4, at least 1.5, at least 1.6. at least 1.7, at least 1.8, at least 1.9, at least 2, at least 2.5, at least 3, at least 3.5, at least 4, at least 4.5, at least 5, at least 6, at least 7, at least 8, at least 9, or even at least 10. In one or more embodiments, the scale up factor may be from 1.3 to 5, from 2 to 4, or from 2.5 to 3.5.

As described herein, constructing a template fluid catalytic reactor 500 may refer to building or otherwise connecting or attaching reactor components to form a template fluid catalytic reactor 500. Additionally, operating a template fluid catalytic reactor 500 may refer to controlling the template fluid catalytic reactor 500 such as to operate one or more chemical reactions to form a product or products from a reactant or reactants in the template catalytic reactor 500. Observing a template fluid catalytic reactor 500 may refer to perceiving, in person or otherwise, a template fluid catalytic reactor 500, either in operation or otherwise. Observing may include collecting data related to the operation of the template fluid catalytic reactor 500. Obtaining data related to a template fluid catalytic reactor 500 may include acquiring any information related to the operation of the template fluid catalytic reactor 500. For example, obtaining data related to the template fluid catalytic reactor 500 may include acquiring information related to the reaction rates, fluid mechanics, process conditions, etc., in a template fluid catalytic reactor 500. For example, obtaining a publication disclosing the design and/or operational parameters of a template fluid catalytic reactor 500 may be included as an act of obtaining data related to the template fluid catalytic reactor 500. In one or more embodiments, data related to the template reactor 500 may include one or more of the cross-sectional area of the template riser 530, the cross-sectional area of the template lower reactor portion 550, the cross-sectional shape of the template riser 558, the cross-section shape of the template lower reactor portion 550, or the shape of the template transition portion 558 (such as the angle of a conical frustum shape).

It should be appreciated that, in some embodiments, step 110 of determining an approximate size for the scaled-up fluid catalytic reactor 600 is optional. For example, in one or more embodiments, a template fluid catalytic reactor 500 may be observed, or data related to the template fluid catalytic reactor 500 may be obtained without previously determining a size of the scaled-up reactor 600. Thereafter, the template fluid catalytic reactor 500 may be scaled-up by the scale-up factor such that the cross-sectional areas of the scaled-up riser 630 and scaled-up bottom reactor portion 650 are scaled-up by the scale-up factor, where the scaled-up transition portion 658 has a height 686 that is at least 70% of the width 682 of the scaled-up riser 630.

Referring still to FIGS. 1 and 3, step 130 may include one or more of constructing or operating a scaled-up fluid catalytic reactor 600 based on the template fluid catalytic reactor 500. The various components of the template fluid catalytic reactor 500 may be scaled-up by a scale-up factor. For example, the ratio of the cross-sectional area of the scaled-up riser 630 to the cross-sectional area of the template riser 530 may be from 80% to 120% of a scale-up factor. Additionally, the ratio of the cross-sectional area of the scaled-up lower reactor portion 650 to the cross-sectional area of the template lower reactor portion 550 may be from 80% to 120% of the scale-up factor. According to additional embodiments, the ratio of the cross-sectional area of the scaled-up riser 630 to the cross-sectional area of the template riser 530 may be from 85% to 115% of the scale-up factor, from 90% to 110% of the scale-up factor, from 95% to 105% of the scale-up factor, from 98% to 102% of the scale-up factor, or even from 99% to 101% of the scale-up factor. According to additional embodiments, and the ratio of the cross-sectional area of the scaled-up lower reactor portion 650 to the cross-sectional area of the template lower reactor portion 550 may be from 85% to 115% of the scale-up factor, from 90% to 110% of the scale-up factor, from 95% to 105% of the scale-up factor, from 98% to 102% of the scale-up factor, or even from 99% to 101% of the scale-up factor. According to one or more embodiments, the scale-up factor and the scale-down factor may be similar, such as within 20%, 10%, 5%, or even 1% of one another.

According to one or more embodiments, the scale-up factor may be at least 1.3, at least 1.4, at least 1.5, at least 1.6. at least 1.7, at least 1.8, at least 1.9, at least 2, at least 2.5, at least 3, at least 3.5, at least 4, at least 4.5, at least 5, at least 6, at least 7, at least 8, at least 9, or even at least 10. In one or more embodiments, the scale up factor may be from 1.3 to 5, from 2 to 4, or from 2.5 to 3.5.

According to one or more embodiments, the scale-up procedure includes maintaining, for example, with about 30%, the height 686 of the scaled-up transition portion 658 relative to the template transition portion 558. For example, the height 686 of the scaled-up transition portion 658 may be from 70% to 120% of the height 586 of the template transition portion 558, from 80% to 120% of the height 586 of the template transition portion 558, from 85% to 115% of the height 586 of the template transition portion 558, from 90% to 110% of the height 586 of the template transition portion 558, from 95% to 105% of the height 586 of the template transition portion 558, from 98% to 102% of the height 586 of the template transition portion 558, or from 99% to 101% of the height 586 of the template transition portion 558. As described herein, without being bound by theory, it is believed that when the height 686 of the scaled-up transition portion 658 is similar to the height 586 of the template transition portion (e.g., within 20%), the residence time and velocity the scaled-up transition portion 658 and template transition portion 558 are similar (for example, within 30% residence time).

According to one or more embodiments, the height 686 of the scaled-up transition portion 658 may be at least 70% of the width 682 of the scaled-up riser 630. For example, the height 686 of the scaled-up transition portion 658 may be at least 70%, at least 75%, at least 80%, at least 85%, at least 90%, at least 95%, at least 100%, at least 105%, at least 110%, at least 115%, at least 120%, at least 125%, at least 130%, at least 150%, at least 200%, or even at least 300% of the width 682 of the scaled-up riser 630.

In one or more embodiments, the difference between the velocity profile in the scaled-up transition portion 658 at a midpoint height of the scaled-up transition portion 658 and the velocity profile in the template transition portion 558 at a midpoint height of the template transition portion 558 is less than or equal to 30%, less than or equal to 25%, less than or equal to 20%, less than or equal to 15%, less than or equal to 10%, or even less than or equal to 10%. As used herein, the velocity profile at the midpoint height of the scaled-up transition portion 658 or template transition portion 558 refers to the average upward velocity of fluids in the scaled-up transition portion 658 or template transition portion 558 at the midpoint height, respectively.

The systems described herein may be utilized as processing equipment for various fluidized catalyst reactions. For example, hydrocarbons, as well as other chemical feedstocks, can be converted into desirable products through use of fluidized bed reactors. Fluidized bed reactors serve many purposes in industry, including dehydrogenation of paraffins and/or alkyl aromatics, cracking of hydrocarbons (i.e., fluid catalytic cracking), chlorination of olefins, oxidations of naphthalene to phthalic anhydride, production of acrylonitrile from propylene, ammonia, and oxygen, Fischer-Tropsch synthesis, and polymerization of ethylene.

For the purposes of describing and defining the present invention it is noted that the term "about" are utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Generally, "inlet ports" and "outlet ports" of any system unit of the fluid catalytic reactor system 102 described herein refer to openings, holes, channels, apertures, gaps, or other like mechanical features in the system unit. For example, inlet ports allow for the entrance of materials to the particular system unit and outlet ports allow for the exit of materials from the particular system unit. Generally, an outlet port or inlet port will define the area of a system unit of the fluid catalytic reactor system 102 to which a pipe, conduit, tube, hose, transport line, or like mechanical feature is attached, or to a portion of the system unit to which another system unit is directly attached. While inlet ports and outlet ports may sometimes be described herein functionally in operation, they may have similar or identical physical characteristics, and their respective functions in an operational system should not be construed as limiting on their physical structures.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A method for scaling-up a fluid catalytic reactor, the method comprising:
one or more of constructing, operating, observing, or obtaining data related to a template fluid catalytic reactor comprising a template riser, a template lower reactor portion, and a template transition portion connecting the template riser and the template lower reactor portion;
one or more of constructing or operating a scaled-up fluid catalytic reactor based on the template fluid catalytic reactor, the scaled-up fluid catalytic reactor comprising a scaled-up riser, a scaled-up lower reactor portion, and a scaled-up transition portion connecting the scaled-up riser and the scaled-up lower reactor portion, wherein:
the ratio of the cross-sectional area of the scaled-up riser to the cross-sectional area of the template riser is from 80% to 120% of a scale-up factor;
the ratio of the cross-sectional area of the scaled-up lower reactor portion to the cross-sectional area of the template lower reactor portion is from 80% to 120% of the scale-up factor;
the scale-up factor is at least 1.3; and
the height of the scaled-up transition portion is at least 70% of the width of the scaled-up riser and from 70% to 130% of the height of the template transition portion.

2. The method of claim 1, wherein the scale-up factor is at least 2.

3. The method of claim 1, wherein the scale-up factor is from 1.3 to 5.

4. The method of claim 1, wherein:
the ratio of the cross-sectional area of the scaled-up riser to the cross-sectional area of the template riser is from 95% to 105% of the scale-up factor; and
the ratio of the cross-sectional area of the scaled-up lower reactor portion to the cross-sectional area of the template lower reactor portion is from 95% to 105% of the scale-up factor.

5. The method of any claim 1, wherein the height of the scaled-up transition portion is at least 95% of the width of the scaled-up riser.

6. The method of claim 1, wherein the method comprises constructing or operating the template fluid catalytic reactor.

7. The method of claim 1, wherein the method comprises observing or obtaining data related to the template fluid catalytic reactor.

8. The method of claim 1, wherein the scaled-up transition portion comprises a frustum shape.

9. The method of claim 1, wherein the scaled-up transition portion comprises a conical frustum shape.

10. A method for scaling-up a fluid catalytic reactor, the method comprising:
determining a size for a scaled-up fluid catalytic reactor that comprises a scaled-up riser, a scaled-up lower reactor portion, and a scaled-up transition portion connecting the scaled-up riser and the scaled-up lower reactor portion, wherein determining the size of the scaled-up fluid catalytic reactor comprises:
determining within 20% of a cross-sectional area and width of the scaled-up riser;
determining within 20% of a cross-sectional area of the scaled-up lower reactor portion; and
determining within 20% of a height of the scaled-up transition portion;
one or more of constructing or operating a template fluid catalytic reactor comprising a template riser, a template lower reactor portion, and a template transition portion connecting the template riser and the template lower reactor portion, wherein:
the ratio of the determined cross-sectional area of the scaled-up riser to the cross-sectional area of the template riser is from 80% to 120% of a scale-down factor;
the ratio of the determined cross-sectional area of the scaled-up lower reactor portion to the cross-sectional area of the template lower reactor portion is from 80% to 120% of the scale-down factor;
the scale-down factor is at least 1.3; and
the height of the template transition portion is at least 70% of the determined width of the scaled-up riser.

11. The method of claim 10, further comprising constructing or operating the scaled-up fluid catalytic reactor.

12. The method of claim 10, wherein the scale-down factor is at least 2.

13. The method of claim 10, wherein the scale-down factor is from 1.3 to 5.

14. The method of claim 10, wherein:
- the ratio of the determined cross-sectional area of the scaled-up riser to the cross-sectional area of the template riser is from 95% to 105% of the scale-down factor; and
- the ratio of the determined cross-sectional area of the scaled-up lower reactor portion to the cross-sectional area of the template lower reactor portion is from 95% to 105% of the scale-down factor.

15. The method of claim 10, wherein the height of the template transition portion is at least 95% of the determined width of the scaled-up riser.

* * * * *